(12) United States Patent
Kang et al.

(10) Patent No.: US 12,090,460 B2
(45) Date of Patent: Sep. 17, 2024

(54) METHOD FOR PRODUCING AEROGEL BLANKET (71) Applicant: LG CHEM, LTD., Seoul (KR)

(72) Inventors: Tae Gyeong Kang, Daejeon (KR); Se Won Baek, Daejeon (KR)

(73) Assignee: LG CHEM, LTD., Seoul (KR)

( * ) Notice: Subject to any disclaimer, the term of this patent is extended or adjusted under 35 U.S.C. 154(b) by 513 days.

(21) Appl. No.: 17/614,164

(22) PCT Filed: Sep. 3, 2020

(86) PCT No.: PCT/KR2020/011859
§ 371 (c)(1),
(2) Date: Nov. 24, 2021

(87) PCT Pub. No.: WO2021/045528
PCT Pub. Date: Mar. 11, 2021

(65) Prior Publication Data
US 2022/0227635 A1    Jul. 21, 2022

(30) Foreign Application Priority Data

Sep. 3, 2019  (KR) .................. 10-2019-0109158
Sep. 30, 2019 (KR) .................. 10-2019-0121147

(51) Int. Cl.
| | | |
|---|---|---|
| *B01J 13/00* | (2006.01) | |
| *B01J 3/00* | (2006.01) | |
| *C01B 33/155* | (2006.01) | |
| *C01B 33/158* | (2006.01) | |
| *C01B 33/159* | (2006.01) | |

(52) U.S. Cl.
CPC .......... *B01J 13/0091* (2013.01); *B01J 3/008* (2013.01); *C01B 33/155* (2013.01); *C01B 33/1585* (2013.01); *C01B 33/159* (2013.01); *C01P 2006/32* (2013.01)

(58) Field of Classification Search
CPC ...... B01J 13/0091; B01J 3/008; C01B 33/155
See application file for complete search history.

(56) References Cited

U.S. PATENT DOCUMENTS

| | | | |
|---|---|---|---|
| 1,131,270 A | 3/1915 | Quick | |
| 5,789,075 A | 8/1998 | Frank et al. | |
| 5,830,387 A | 11/1998 | Yokogawa et al. | |
| 6,068,882 A | 5/2000 | Ryu | |
| 6,364,953 B1 | 4/2002 | Kawakami et al. | |
| 6,799,442 B1 | 10/2004 | Costa et al. | |
| 6,989,123 B2 * | 1/2006 | Lee ................... | B29C 39/14 264/308 |
| 7,780,890 B2 * | 8/2010 | Lee ................... | B29C 39/16 264/212 |
| 9,073,759 B2 * | 7/2015 | Zeng .................. | C01B 33/1585 |
| 10,941,897 B2 * | 3/2021 | Kim ................... | C01B 33/155 |
| 2001/0034375 A1 | 10/2001 | Schwertfeger et al. | |
| 2005/0046086 A1 | 3/2005 | Lee et al. | |
| 2005/0167891 A1 | 8/2005 | Lee et al. | |
| 2006/0196568 A1 * | 9/2006 | Leeser ................ | F16L 59/125 138/146 |
| 2006/0286360 A1 * | 12/2006 | Rhine ................. | B01J 21/08 428/221 |
| 2008/0093016 A1 | 4/2008 | Lee et al. | |
| 2009/0123358 A1 | 5/2009 | Costa et al. | |
| 2012/0025127 A1 | 2/2012 | Yeo et al. | |
| 2013/0344279 A1 * | 12/2013 | Doshi ................. | D04H 1/413 427/372.2 |
| 2016/0096949 A1 | 4/2016 | Evans et al. | |
| 2018/0009969 A1 | 1/2018 | Kim et al. | |
| 2018/0029892 A1 | 2/2018 | Yu et al. | |
| 2018/0072578 A1 | 3/2018 | Kim et al. | |
| 2018/0094114 A1 | 4/2018 | Evans et al. | |
| 2018/0112057 A1 | 4/2018 | Evans et al. | |
| 2018/0112058 A1 | 4/2018 | Evans et al. | |
| 2018/0134867 A1 | 5/2018 | Evans et al. | |
| 2018/0147811 A1 | 5/2018 | Oh et al. | |
| 2018/0148888 A1 | 5/2018 | Kim et al. | |
| 2018/0179073 A1 | 6/2018 | Oh et al. | |
| 2018/0179074 A1 | 6/2018 | Kim et al. | |
| 2018/0179075 A1 | 6/2018 | Kim et al. | |
| 2018/0244029 A1 | 8/2018 | Kim et al. | |
| 2018/0264793 A1 | 9/2018 | Kim et al. | |
| 2018/0326700 A1 | 11/2018 | Kim | |
| 2018/0354805 A1 | 12/2018 | Kim et al. | |

(Continued)

FOREIGN PATENT DOCUMENTS

| | | |
|---|---|---|
| CN | 101137587 A | 3/2008 |
| CN | 101698583 A | 4/2010 |

(Continued)

OTHER PUBLICATIONS

Parale, Vinayak G., et al., "Flexible and Transparent Silica Aerogels: An Overview". Journal of the Korean Ceramic Society vol. 54, No. 3, 2017, pp. 184-199.*
Latifi, Fatemeh, et al., "Effect of processing parameters and pore structure of nanostructured silica aerogel on the physical properties of aerogel blankets". Materials Research Express 5 (2018) 055020, pp. 1-11.*
Chakraborty, S., et al., "Synthesis and Characterization of Fibre Reinforced Silica Aerogel Blankets for Thermal Protection". Advances in Materials Science and Engineering vol. 2016, Article ID 2495623, pp. 1-8.*
Huang, Yajun, et al., "Fast preparation of glass fiber/silica aerogel blanket in ethanol & water solvent system". Journal of Non-Crystalline Solids, 505 (2019) 286-291.*
Iswar et al., "Effect of aging on silica aerogel properties," 2017, Microporous and Mesoporous Materials, vol. 241, p. 293-302.

(Continued)

*Primary Examiner* — Bret P Chen
(74) *Attorney, Agent, or Firm* — Morgan, Lewis & Bockius LLP (57) ABSTRACT

The production method of the present invention can reuse a non-impregnated catalyzed sol, which has been typically discarded, by recovering the catalyzed sol, which is not impregnated in impregnating of a catalyzed sol into a blanket base, to stop gelating the catalyzed sol, and then using this in subsequently preparing a catalyzed sol.

15 Claims, 1 Drawing Sheet

(56) References Cited

U.S. PATENT DOCUMENTS

| | | |
|---|---|---|
| 2019/0002356 A1 | 1/2019 | Hebalkar |
| 2019/0062167 A1 | 2/2019 | Kim et al. |
| 2019/0119494 A1 | 4/2019 | Makino et al. |
| 2019/0203014 A1 | 7/2019 | Evans et al. |
| 2019/0276322 A1 | 9/2019 | Kim et al. |
| 2020/0025324 A1 | 1/2020 | Izumi et al. |
| 2020/0048100 A1 | 2/2020 | Yu et al. |
| 2020/0215791 A1 | 7/2020 | Oh et al. |
| 2020/0216322 A1 | 7/2020 | Min et al. |
| 2020/0224005 A1 | 7/2020 | Kim et al. |
| 2020/0255295 A1 | 8/2020 | Kim et al. |
| 2020/0308011 A1 | 10/2020 | Kim et al. |
| 2021/0114887 A1 | 4/2021 | Oh et al. |
| 2021/0155486 A1 | 5/2021 | Kang et al. |
| 2021/0198112 A1 | 7/2021 | Oh et al. |
| 2022/0048778 A1* | 2/2022 | Kim ............... B01J 13/0091 |
| 2022/0064010 A1* | 3/2022 | Oh ................. C01B 33/159 |
| 2022/0080377 A1* | 3/2022 | Kang ............... C01B 33/145 |
| 2022/0098046 A1* | 3/2022 | Lee ................. C01B 33/155 |
| 2022/0204350 A1* | 6/2022 | Oh ................. C01B 33/145 |
| 2022/0227635 A1* | 7/2022 | Kang ............... C01B 33/158 |
| 2022/0371902 A1* | 11/2022 | Kang ............... C01B 33/159 |

FOREIGN PATENT DOCUMENTS

| | | | |
|---|---|---|---|
| CN | 103910516 A | 7/2014 | |
| CN | 104164758 A | 11/2014 | |
| CN | 105597635 A | 5/2016 | |
| CN | 105664809 A | 6/2016 | |
| CN | 106630930 A | 5/2017 | |
| CN | 106794996 A | 5/2017 | |
| CN | 107034678 A | 8/2017 | |
| CN | 107129262 A | 9/2017 | |
| CN | 107406327 A | 11/2017 | |
| CN | 107523275 A | 12/2017 | |
| CN | 107531495 A | 1/2018 | |
| CN | 107709013 A | 2/2018 | |
| CN | 107735362 A | 2/2018 | |
| CN | 107735385 A | 2/2018 | |
| CN | 107848815 A | 3/2018 | |
| CN | 207310663 U | 5/2018 | |
| CN | 108136749 A | 6/2018 | |
| CN | 108383129 A | 8/2018 | |
| CN | 108585762 A | 9/2018 | |
| CN | 108658572 A | 10/2018 | |
| CN | 108689678 A | 10/2018 | |
| CN | 108821741 A | 11/2018 | |
| CN | 109415214 A | 3/2019 | |
| CN | 109437832 A | 3/2019 | |
| CN | 109868598 A | 6/2019 | |
| CN | 110615663 A | 12/2019 | |
| CN | 111925186 A | 11/2020 | |
| EP | 3235788 A1 * | 10/2017 | ........... C01B 33/158 |
| EP | 3 284 720 A1 | 2/2018 | |
| EP | 3 375 757 A1 | 9/2018 | |
| EP | 3453676 A1 | 3/2019 | |
| EP | 3569304 A1 | 11/2019 | |
| EP | 3 778 483 A1 | 2/2021 | |
| EP | 3 878 812 A1 | 9/2021 | |
| EP | 3 901 094 A1 | 10/2021 | |
| JP | 2001-7100 A | 1/2001 | |
| JP | 2001-72408 A | 3/2001 | |
| JP | 2003-513873 A | 4/2003 | |
| JP | 4115088 B2 | 7/2008 | |
| JP | 2008-532898 A | 8/2008 | |
| JP | 2011-190136 A | 9/2011 | |
| JP | 2012-144428 A | 8/2012 | |
| JP | 2014-173222 A | 9/2014 | |
| JP | 2018-523022 A | 6/2016 | |
| JP | WO2017/010551 A1 | 1/2017 | |
| JP | 2017-533163 A | 11/2017 | |
| JP | 2018-532682 A | 11/2018 | |
| JP | 2018-535178 A | 11/2018 | |
| JP | 2018-204725 A | 12/2018 | |
| JP | 2018-537311 A | 12/2018 | |
| JP | 2018-537383 A | 12/2018 | |
| JP | 2018-538224 A | 12/2018 | |
| JP | 2021-523869 A | 9/2021 | |
| KR | 2001-0104372 A | 11/2001 | |
| KR | 10-0372823 B1 | 2/2003 | |
| KR | 10-0385289 B1 | 10/2003 | |
| KR | 10-0385829 B1 | 10/2003 | |
| KR | 10-0710887 B1 | 4/2007 | |
| KR | 10-2007-0114668 A | 12/2007 | |
| KR | 10-0831877 B1 | 5/2008 | |
| KR | 10-2010-0053350 A | 5/2010 | |
| KR | 10-2010-0133268 A | 12/2010 | |
| KR | 10-2011-0067163 A | 6/2011 | |
| KR | 10-2011-0082379 A | 7/2011 | |
| KR | 10-2011-0126381 A | 11/2011 | |
| KR | 10-2012-0012836 A | 2/2012 | |
| KR | 10-1147494 B1 | 5/2012 | |
| KR | 10-2012-0070948 A | 7/2012 | |
| KR | 10-1176137 B1 | 8/2012 | |
| KR | 10-2014-0120721 A | 10/2014 | |
| KR | 10-1498562 B1 | 3/2015 | |
| KR | 10-2016-0101330 A | 8/2016 | |
| KR | 2017-0031011 A | 3/2017 | |
| KR | 10-2017-0063800 A | 6/2017 | |
| KR | 10-2017-0096513 A | 8/2017 | |
| KR | 10-2017-0096514 A | 8/2017 | |
| KR | 10-2017-0098003 A | 8/2017 | |
| KR | 10-2017-0098592 A | 8/2017 | |
| KR | 10-2017-0112985 A | 10/2017 | |
| KR | 10-2018-0029235 A | 3/2018 | |
| KR | 10-2018-0033064 A | 4/2018 | |
| KR | 2018-0132723 A | 12/2018 | |
| KR | 10-2019-0008007 A | 1/2019 | |
| KR | 10-1953349 B1 | 2/2019 | |
| KR | 20190021956 A | 3/2019 | |
| KR | 10-1953347 B1 | 5/2019 | |
| KR | 10-2019-0063799 A | 6/2019 | |
| KR | 10-2019-0065325 A | 6/2019 | |
| KR | 10-2019-0078765 A | 7/2019 | |
| KR | 10-2019-0098728 A | 8/2019 | |
| KR | 10-2023531 B1 | 9/2019 | |
| KR | 10-2020-0063084 A | 6/2020 | |
| KR | 10-2020-0077263 A | 6/2020 | |
| WO | WO 2005/003476 * | 1/2005 | |
| WO | 2016/054524 A2 | 4/2016 | |
| WO | 2017/145359 A1 | 8/2017 | |
| WO | 2017/171217 A1 | 10/2017 | |
| WO | 2018/208005 A1 | 11/2018 | |
| WO | 2019/039841 A1 | 2/2019 | |
| WO | WO 2019/039841 * | 2/2019 | ........... C01B 33/158 |
| WO | 2019/098519 A1 | 5/2019 | |
| WO | 2019/107706 A1 | 6/2019 | |
| WO | 2021/045483 A1 | 3/2021 | |

OTHER PUBLICATIONS

Yokogawa et al., "Hydrophobic silica aerogels," 1995, Journal of Non-Crystalline Solids, vol. 186, p. 23-29.
Final Office Action issued Sep. 11, 2023 for counterpart U.S. Appl. No. 17/425,906.
Non-Final Office Action issued Oct. 19, 2023 for counterpart U.S. Appl. No. 17/416,619.
Final Office Action issued Nov. 2, 2023 for counterpart U.S. Appl. No. 17/429,116.
Extended European Search Report issued in corresponding European Patent Application No. 20860200.3 dated Sep. 27, 2022.
Extended European Search Report issued in corresponding European Patent Application No. 20859770.8 dated Sep. 30, 2022.
Ma et al., "Preparation and Low-temperature Properties of Fiber Reinforced SiO2 Aerogel Composites," Materials Review, 2015, vol. 29, No. 10, pp. 43-46 (see English abstract).
Zhang et al., "Hygrothermal performance of silica aerogel composite for thermal insulation material," New Building Materials, 2017, No. 3, pp. 67-71 (see English abstract).
Extended European search report issued in corresponding European Patent Application No. 20861673.0 dated Dec. 1, 2021.

(56) References Cited

OTHER PUBLICATIONS

Extended European search report issued in corresponding European Patent Application No. 20860326.6 dated Jan. 4, 2022.
Extended European search report issued in corresponding European Patent Application No. 20860342.3 dated Jan. 21, 2022.
International Search Report issued in corresponding International Patent Application No. PCT/KR2020/011859 dated Dec. 14, 2020.
Aspen Aerogel, "Vibration Testing Report," (2003).
Lee, et al. "Super-insulating, flame-retardant, and flexible poly(dimethylsiloxane) composites based on silica aerogel," Composites Part A: Applied Science and Manufacturing, vol. 123, p. 108-113, 2019 https://doi.org/10.1016/j.compositesa.2019.05.004.
Non-Final Office Action issued on Feb. 20, 2024 for U.S. Appl. No. 17/429,116.
Office Action issued in the corresponding U.S. Appl. No. 17/425,906, dated Apr. 12, 2023.
Office Action issued in the corresponding U.S. Appl. No. 17/621,830, dated May 23, 2023.
Rao et al., "Synthesis and Characterization of Hydrophobic TMES/TEOS Based Silica Aerogels," Journal of Porous Materials, 2003, pp. 23-29, Maharashtra State, India.

\* cited by examiner

METHOD FOR PRODUCING AEROGEL BLANKET

CROSS-REFERENCE TO RELATED APPLICATIONS

This application claims the benefit of Korean Patent Application Nos. 10-2019-0109158, filed on Sep. 3, 2019, and 10-2019-0121147, filed on Sep. 30, 2019, both of which are incorporated herein by reference in their entirety.

TECHNICAL FIELD

The present invention relates to a method for producing an aerogel blanket, and more specifically, to a method for producing an aerogel blanket, the method including a process of recovering and reusing a sol non-impregnated in a blanket in the production of the aerogel blanket.

BACKGROUND ART

Aerogel is an ultra-porous material having a high specific surface area 500 $m^2$/g) with a porosity of 90-99.9% and a pore size ranging of 1-100 nm. Since the aerogel has characteristics such as excellent lightweight/ultra-insulation/ultra-low dielectric properties, not only studies on the development of aerogel materials but also application studies on transparent insulation materials, environmentally friendly high-temperature insulation materials, ultra-low dielectric thin film materials for highly integrated devices, materials for catalysts and catalyst carriers, electrode materials for super capacitors, and electrode materials for seawater desalination are being actively conducted.

The biggest advantage of aerogel is that the aerogel has super-insulation that shows a thermal conductivity of 0.300 W/m·K or less which is lower than an organic insulation material such as Styrofoam, and can solve fire vulnerability and toxic gas generation in fire, which are fatal weaknesses of the organic insulation material.

In general, aerogel is produced by preparing hydrogel from a precursor material and removing liquid components inside the hydrogel without destroying microstructures. Aerogel has typical forms which can be divided into three: powder, granule, monolith, and is generally produced in a form of powder.

The aforementioned powder may be combined with fibers so as to be commercialized in the form such as an aerogel blanket or aerogel sheet. Since the blanket or sheet has flexibility, the blanket or sheet may be bent, folded, or cut in any size or form. Thus, the aerogel may be applied not only to industrial applications such as insulation panels for LNG carriers, industrial insulation materials, and insulation materials for space suits, transportation and vehicles, and power generation, but also to household goods such as jackets and sneakers. Also, when the aerogel is used for fire doors as well as roofs or floors in a house such as apartments, there is a great effect in preventing fire.

The aerogel blanket is formed of aerogel which is physically coupled and impregnated to a blanket base such as a fiber, and is produced by mixing a sol with a blanket base to impregnate the sol into the blanket base and then gelate the same. In order to achieve target physical properties of the aerogel blanket, it is important that after a sufficient amount of sol is impregnated into a blanket base, the gelation is performed. When a less amount of sol compared to a volume of the blanket base is impregnated, there may occur a limitation in that a heat insulation performance of the produced aerogel blanket is deteriorated and hydrophobicity characteristics thereof are also deteriorated. To prevent this, an excessive amount of sol is used in the impregnating the sol into the blanket base in the process of producing an aerogel blanket, and thus a non-impregnated sol is generated, which is discarded, thereby resulting in a problem of waste disposal and an increase in costs of raw materials.

Therefore, the development of technology has been required which is capable of reusing a sol, which has been typically discarded since the sol was excessively injected in the impregnating of the sol into the blanket base and then was not impregnated in the blanket base.

DISCLOSURE OF THE INVENTION

Technical Problem

An aspect of the present invention provides a method for producing an aerogel blanket, the method being capable of recovering and reusing a sol which is not impregnated in a blanket and which is generated in impregnating of the sol into the blanket base in the process of producing the aerogel blanket.

Technical Solution

According to an aspect of the present invention, there is provided a method for producing an aerogel blanket, the method including: 1) impregnating a catalyzed sol into a blanket base; and 2) gelating the catalyzed sol to prepare a wet-gel blanket composite, wherein the method includes: A) after the impregnating, recovering a non-impregnated catalyzed sol, and then stopping gelation of the recovered sol by adding a solvent to dilute the non-impregnated catalyzed sol; and B) reusing the gelation-stopped recovered sol in preparing of a catalyzed sol, and the catalyzed sol prepared through step B) above contains 5-50 wt % of the gelation-stopped recovered sol.

Advantageous Effects

The production method of the present invention can reuse a non-impregnated catalyzed sol, which has been typically discarded, by recovering the catalyzed sol, which is not impregnated in impregnating of a catalyzed sol into a blanket base, to stop gelating the catalyzed sol, and then using this in subsequently preparing a catalyzed sol. In addition, according to the production method of the present invention, the recovered non-impregnated catalyzed sol is reused to prepare a new catalyzed sol, and thereby a silica network included in the recovered non-impregnated catalyzed sol helps to gelate a new catalyzed sol, which may exhibit effects of structure reinforcement and physical properties improvement of aerogel. Thus, the production method of the present invention may be usefully used for the preparation of an aerogel blanket.

BRIEF DESCRIPTION OF THE DRAWINGS

The following drawings attached herein illustrates a preferred embodiment of the present invention by example, and serves to enable technical concepts of the present invention to be further understood together with detailed description of the invention given below, and therefore the present invention should not be interpreted only with matters in such a drawing.

BEST MODE FOR CARRYING OUT THE INVENTION

Hereinafter, the present invention will be described in more detail to aid in understanding the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

According to an embodiment of the present invention, a method for producing an aerogel blanket is characterized by including: 1) impregnating a catalyzed sol into a blanket base; and 2) gelating the catalyzed sol to prepare a wet-gel blanket composite, in which the method includes: A) after the impregnating, recovering a non-impregnated catalyzed sol, and then stopping gelation of the recovered sol by adding a solvent to dilute the non-impregnated catalyzed sol; and B) reusing the gelation-stopped recovered sol in preparing of a catalyzed sol, and the catalyzed sol prepared through step B) above contains 5-50 wt % of the gelation-stopped recovered sol.

The method for producing an aerogel blanket of the present invention may be divided into a process of producing an aerogel blanket and a process of recovering a non-impregnated catalyzed sol, which is generated through the impregnating and the gelating of the sol in the process of producing the aerogel blanket and reusing the same, and the process of reusing the non-impregnated catalyzed sol may further include a process of producing an aerogel blanket.

Hereinafter, the process of producing the aerogel blanket will be described in detail by each step.

Step 1)

In the method for producing an aerogel blanket of the present invention, step 1) above is preparing in order to form an aerogel blanket, and a process of impregnating a catalyzed sol into a blanket base is carried out.

The term "impregnation" herein may be carried out by adding a catalyzed sol having fluidity into a blanket base, and may represent that the catalyzed sol is permeated through pores inside the blanket base.

In the present invention, the catalyzed sol may be prepared by mixing a sol and a base catalyst. The base catalyst may exhibit an effect of promoting the gelation in step 2) above by increasing the pH of the sol.

The sol is not limited as long as the sol is a material capable of forming porous gel by a sol-gel reaction. Particularly, the sol may include an inorganic sol, an organic sol, or a combination thereof. The inorganic sol may comprise zirconia, yttrium oxide, hafnia, alumina, titania, ceria, silica, magnesium oxide, calcium oxide, magnesium fluoride, calcium fluoride and combinations thereof, and the organic sol may comprise polyacrylate, polyolefin, polystyrene, polyacrylonitrile, polyurethane, polyimide, polyfurfural alcohol, phenol furfuryl alcohol, melamine formaldehyde, resorcinol formaldehyde, cresol formaldehyde, phenol formaldehyde, polyvinyl alcohol dialdehyde, polycyanurates, polyacrylamides, various epoxies, agar, agarose, and combinations thereof. In addition, the sol may be particularly a silica sol. When the silica sol is used as the sol, the sol exhibits excellent miscibility with the blanket base, and when this is used to form a gel, the gel may have more porosity, and an aerogel blanket having a low thermal conductivity may be produced.

In an embodiment of the present invention, the sol may contain a sol precursor, water, and an organic solvent, and the sol may be prepared by mixing the sol precursor, the water and the organic solvent. When a catalyzed sol according to an embodiment of the present invention is a catalyzed silica sol, the catalyzed sol in step 1) above may be prepared by mixing a silica sol and a base catalyst, and the silica sol may be prepared by mixing a silica precursor, water, and an organic solvent. In addition, the silica sol may be hydrolyzed in a low pH in order to facilitate the gelation, and in this case, an acid catalyst may be used in order to reduce the pH.

The silica precursor, which can be used to prepare the silica sol, may be a silicon-containing alkoxide-based compound, and particularly, tetraalkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate, or the like. Among these, the silica precursor according to an embodiment of the present invention may be tetraethyl orthosilicate (TEOS).

The silica precursor may be used in an amount so that a content of silica ($SiO_2$) contained in the silica sol is 3 wt % to 30 wt %. If the content of the silica is less than 3 wt %, a content of the silica aerogel in the finally prepared blanket is too low to cause a problem that a desired level of a thermal insulation effect is not expected. If the content of the silica exceeds 30 wt %, there is a worry that the silica aerogel is excessively formed to deteriorate mechanical properties of the blanket, particularly, flexibility of the blanket.

In addition, an organic solvent which can be used to prepare the sol of the present invention can be used without limitation as long as the organic solvent has excellent compatibility with a sol precursor and water. Particularly, a polar organic solvent may be used and more particularly, alcohol may be used. The alcohol may be, particularly, monohydric alcohol such as methanol, ethanol, isopropanol and butanol; polyhydric alcohol such as glycerol, ethylene glycol, propylene glycol, diethylene glycol, dipropylene glycol, and sorbitol, and any one of the above materials or a mixture of two or more thereof may be used. Among these, when considering miscibility with water and aerogel which is subsequently prepared, monohydric alcohol having 1 to 6 carbon atoms such as methanol, ethanol, isopropanol, butanol, and the like may be used.

The organic solvent as described above may be used in a proper content considering the content of the finally prepared aerogel.

The silica sol according to an embodiment of the present invention may contain the silica precursor and the water at a molar ratio of 1:4 to 1:1. Also, the silica precursor and the organic solvent may be contained at a weight ratio of 1:2 to 1:9, and preferably may be contained at a weight ratio of 1:4 to 1:6. When the silica precursor satisfies the molar ratio or the weight ratio above with the water and the organic solvent, the production yield of the aerogel may increase, thereby exhibiting an improvement effect in terms of the thermal insulation performance.

In addition, in the sol according to an embodiment of the present invention, the acid catalyst, which may be further included, can be used without limitation as long as the acid catalyst makes the pH become 3 or less, for example, hydrochloric acid, nitric acid, or sulfuric acid may be used. In this case, the acid catalyst may be added in an amount so that the sol has a pH of 3 or less, and may be added in an aqueous solution in which the acid catalyst is dissolved in an aqueous solvent.

Furthermore, the base catalyst, which can be used in the catalyzed silica sol according to an embodiment of the present invention, may include: an inorganic base such as sodium hydroxide or potassium hydroxide; or an organic base such as ammonium hydroxide. Particularly, the base catalyst may be at least one selected from the group consisting of sodium hydroxide (NaOH), potassium hydroxide (KOH), calcium hydroxide ($Ca(OH)_2$), ammonia ($NH_3$), ammonium hydroxide ($NH_4OH$; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino)ethanol, 2-(methyl amino)ethanol, N-methyl diethanolamine, dimethylaminoethanol, diethylaminoethanol, nitrilotriethanol, 2-(2-aminoethoxy)ethanol, 1-amino-2-propanol, triethanolamine, monopropanolamine, dibutanolamine, and preferably, may be sodium hydroxide, ammonia, ammonium hydroxide, or a mixture thereof.

The base catalyst may be contained in an amount so that the sol has a pH of 7 to 11. When the pH of the sol is out of the above range, the gelation of step 2) which will be described below may not be easily performed, or a gelation rate may be too slow to deteriorate processability. Also, since the base is precipitated when being added in a solid phase, the base may be added, particularly, in an aqueous solvent or in a solution phase that is diluted with the above-mentioned organic solvent. In this case, a dilution ratio of the base catalyst to the organic solvent, particularly, the alcohol may be 1:4 to 1:100 based on a volume.

According to an embodiment of the present invention, the catalyzed sol may further include additives as necessary, and in this case, all the known additives, which can be added during producing aerogel, can be applied as the additives, and for example, additives such as an opacifying agent and a fire retardant material may be used.

In addition, the blanket base according to an embodiment of the present invention may be particularly a porous base in terms of the improvement of the thermal insulation properties of the aerogel blanket. When the porous blanket base is used, the catalyzed sol may be easily penetrated into the base to uniformly form the aerogel inside the blanket base. Thus, the produced aerogel blanket may have excellent thermal insulation properties.

The usable blanket base according to an embodiment of the present invention may be a film, a sheet, a net, fiber, foam, nonwoven fabric, or a laminate having two or more layers thereof. Also, surface roughness may be formed or patterned on the surface of the blanket according to application of the blanket. More particularly, the blanket base may include a space or pore, through which the aerogel is easily injected into the blanket base, thereby improving thermal insulation performance. Further, it may be preferable that the blanket base has a low thermal conductivity.

Particularly, the blanket base may be polyamide, polybenzimidazole, polyaramid, an acrylic resin, a phenol resin, polyester, polyether ether ketone (PEEK), polyolefin (for example, polyethylene, polypropylene, or a copolymer thereof), cellulose, carbon, cotton, wool, hemp, non-woven fabric, glass fiber, or ceramic wool, and more particularly, the blanket base may be glass fiber (glass felt).

According to an embodiment of the present invention, the catalyzed sol may be added in an amount of 100 to 170%, particularly, 110 to 160%, and more particularly 115 to 155% with respect to the volume of the blanket base.

When the catalyzed sol satisfies the addition ratio (addition amount) to the volume of the blanket base, since the catalyzed sol is more uniformly impregnated into the blanket base, the aerogel blanket produced may have more uniform physical properties, and since the catalyzed sol can be fully impregnated into the blanket base, the loss of the raw material may be prevented and a problem of gelating the catalyzed sol alone may be prevented.

Step 2)

In step 2) above, the process of gelating the catalyzed sol to prepare a wet-gel blanket composite is carried out.

In the present invention, the gelation may be to form a network structure from the catalyzed sol, and the network structure may show a planar net shape structure in which particular polygons having one or more types of atom arrangements are connected, or a structure in which vertices, edges, faces, etc. of a particular polyhedron are shared to form a three-dimensional skeleton structure.

According to an embodiment of the present invention, after completing step 1) above, step 2) above may be initiated, and therefore, step 1) above and step 2) above may be sequentially carried out. In addition, according to another embodiment of the present invention, before completing step 1) above, step 2) above may be initiated. If step 2) above is initiated before completing step 1) above, the impregnating of the catalyzed sol into the blanket base may be completed before completing the gelation.

In an embodiment of the present invention, step 1) above of impregnating a catalyzed sol into a blanket base and step 2) of gelating the catalyzed sol to prepare a wet-gel blanket composite may be carried out by a roll-to-roll method in which the blanket base is disposed on a moving element and the catalyzed sol is applied to the blanket base and gelated while continuously moving the moving element, or a method in which both the catalyzed sol and the blanket base are added to a reaction container and gelated to produce an aerogel blanket.

In an embodiment of the present invention, step 1) above of impregnating a catalyzed sol into a blanket base may be carried out by adding the catalyzed sol and the blanket base to a reaction container. In addition, the adding order of the blanket base and the catalyzed sol, which are added to the reaction container, is not particularly limited. Specifically, step 1) above may be carried out by any one method from among a method of adding the catalyzed sol to the reaction container after adding the blanket base thereto, a method of adding the blanket base to the reaction container after adding the catalyzed sol thereto, and a method of adding the blanket base to the reaction container while adding the catalyzed sol thereto. Among these, particularly, the method of adding the catalyzed sol after adding the blanket base in order to impregnating more uniformly may be used. In the case of adding the blanket base first, since the blanket base can be rotated when the catalyzed sol is added, more uniform impregnation may be induced.

According to an embodiment of the present invention, the impregnation in step 1) above may be carried out while rotating the blanket base. When the impregnation is carried out while rotating the blanket base, the effect of inducing uniform impregnation may be exhibited because the catalyzed sol is brought into uniformly contact with all the surfaces of the blanket base.

The blanket base may be added in a proper form which is easy to be added according to the shape of the reaction container. In an embodiment of the present invention, the blanket base may be added to the reaction container in a state in which the blanket base is wound around a bobbin. Rotating the bobbin can rotate the blanket base, and the catalyzed sol can be impregnated while rotating the bobbin rotates the blanket base. Specifically, the blanket base may be added to the reaction container while the blanket base is wound around the bobbin in a roll shape in order to facilitate the rotation.

The bobbin may be an axis which can rotate the blanket base, and anything can be applied as long as the blanket base may be wound around. For example, a prismatic pillar having a size, which can be put into the reaction container, may be used, and preferably a cylindrical pillar. In addition, according to an embodiment of the present invention, the bobbin may include a winding rod around which the blanket base can be wound in a roll shape and a support plate which supports a side portion so that the blanket base, which is wound around the winding rod, does not deviate during rotating. In this case, the winding rod may have multiple hollows in order that the catalyzed sol is easily impregnated even into an inner portion of the blanket base. Meanwhile, the support plate may be used as a mesh type or may include multiple hollows in order that the catalyzed sol can flow into the side portion of the blanket base. Any material may be used as the material of the bobbin as long as it has sufficient strength which can support the blanket, and particularly stainless steel, PE, PP, Teflon, etc. may be used.

After the blanket base is wound around the bobbin and then this is added to the reaction container, a process of fixing the bobbin in the reaction container may be performed. In this case, the bobbin can be fixed at any position of the reaction container, but particularly, the bobbin may be fixed at the center of the reaction container since a lot of blanket bases are added into the reaction container with the same volume, thereby improving production efficiency. In addition, the bobbin may be positioned so that the major axis of the bobbin is in parallel with the major axis of the reaction container.

According to an embodiment of the present invention, the reaction container may be a reaction container for performing the gelation, and a container having any shape such as prismatic or cylindrical may be used as long as the container forms a space so that the blanket base impregnated with the catalyzed sol can rotate, but preferably a cylindrical reaction container may be used in order to facilitate the addition of the blanket base which is wound in a roll shape and facilitate the rotation of the blanket base impregnated with the catalyzed sol during the gelation reaction.

In step 1) above, when the catalyzed sol is added, the blanket base may be slightly pressed to be fully impregnated in order to well couple the blanket base and the catalyzed sol. Thereafter, the blanket base may be pressed to a certain thickness with a constant pressure to remove excessive sol, thereby reducing drying time.

In addition, the catalyzed sol and the blanket base may be added, respectively, to be a total of 1 to 100% of the volume inside the reaction container, particularly, the inner volume of the reaction container, and in order to reduce the gelation time in the step 2) and form aerogel uniformly inside the blanket base, the catalyzed sol and the blanket base may be added, respectively, to be preferably 1 to 60% of the volume of the reaction container, more preferably, 10 to 60%, and even more preferably 30 to 60%.

Meanwhile, in an embodiment of the present invention, when step 2) above is performed before completing sept 1) above, all the catalyzed sol may be added to the reaction container until the gelation is completed in step 2) above, particularly, before the gelation is completed.

In an embodiment of the present invention, the gelation in step 2) above may be carried out by rotating the blanket base impregnated with the catalyzed sol.

The rotation of the blanket base impregnated with the catalyzed sol may be performed by using any method and device as long as they can make the blanket base rotate during gelating in the reaction container, and particularly, in the case where the blanket base is added and fixed in a state in which the blanket base is wound around the bobbin in step 1) above, the blanket base impregnated with the catalyzed sol is present in the reaction container while being wound around the bobbin, and thus rotating the bobbin may make the blanket base impregnated with the catalyzed sol rotate.

According to an embodiment of the present invention, the gelation reaction may be performed after sealing the reaction container to which the catalyzed sol and the blanket base are added. In addition, according to an embodiment of the present invention, the major axis may be disposed in a transverse direction, i.e., a horizontal direction and be rotated. If the reaction container (main body) is a cylindrical reaction container, the cylindrical reaction container can be rotated while lying. That is, the rotation axis of the reaction container of the present invention may be a horizontal direction, but is not limited thereto.

According to an embodiment of the present invention, a type of a production device of an aerogel blanket is not limited as long as the production device includes the reaction container (main body) and can rotate the blanket base impregnated with the catalyzed sol present in the reaction container, and any known device may be used as long as it can rotate the blanket base. Particularly, if a device can fix the position of the bobbin in the reaction container and make the fixed bobbin rotate, any known device may be used. An embodiment of the production device of the aerogel blanket which may be applied in the present invention will be described later.

According to an embodiment of the present invention, when the gelation of step 2) above is carried out by rotating the blanket base impregnated with the catalyzed sol, the rotation speed may be applied without limitation as long as it can uniformly form the aerogel in the blanket. For example, the gelation may be performed by rotating at a rotation speed of 1 rpm to 300 rpm, preferably 5 rpm to 150 rpm, 5 rpm to 100 rpm, and more preferably, 10 rpm to 30 rpm. When the reaction container satisfies the above range of the rotation speed, the sol may be uniformly impregnated in the blanket base, thereby forming the aerogel more uniformly during the gelation, and thus very uniform thermal conductivity may be secured in the entire aerogel blanket, and there is an advantage that the stability of the reaction container and a device of rotating the same is improved to thus improve the stability of the production process of the aerogel blanket.

In the case where the aerogel blanket is produced by adding all the catalyzed sol and the blanket base in the reaction container to gelate, it may have an advantage that space in use may be significantly saved in the production compared to a roll-to-roll method since a separate moving element such as a conveyer belt is not required. In addition, in the case where the aerogel blanket is produced by adding all the catalyzed sol and the blanket base in the reaction container to gelate, it has an advantage that when the blanket base having the same thickness and length is used, the aerogel blanket can be produced in a much shorter time compared to the roll-to-roll method in which the gelation is sequentially performed over time. In particular, as the blanket base is longer, the gelation process time is still longer in order to fully gelate the entire blanket base. If this is performed by the method in which the aerogel blanket is produced by adding all the catalyzed sol and the blanket base in the reaction container to gelate, the production time may be significantly reduced because the gelation of the sol is performed all over the blanket base at the same time. In addition, since the length and thickness of the blanket base do not have an effect on the gelation time, even if a long blanket base is used, the production time may be significantly reduced, thereby maximizing process efficiency.

Also, the gelation is performed while rotating the reaction container, a centrifugal force and a centripetal force act, and thus this method can produce an aerogel blanket in which the aerogel is dispersed more uniformly compared to the roll-to-roll method in which the reaction container is not rotated or the gelation is performed on the moving element. Therefore, the thickness of the produced aerogel blanket is the same as or extremely similar to the thickness of the blanket base, and there is an effect of excellent thermal insulation properties.

Meanwhile, the method for producing an aerogel blanket according to an embodiment of the present invention may further include 3) aging the gelated wet-gel blanket composite and 4) surface-modifying the gelated wet-gel blanket composite.

The aging may be performed by leaving the gelated wet-gel blanket composite at an appropriate temperature to complete a chemical change, and the formed network structure may be formed more stably through the aging, thereby enhancing the mechanical stability of the aerogel blanket produced by the production method of the present invention.

The aging has an effect of further facilitating the maintenance of the pore structure in a rapid drying process to be subsequently performed by adding a solution, in which a base catalyst such as sodium hydroxide (NaOH), potassium hydroxide (KOH), ammonium hydroxide ($NH_4OH$), triethylamine, or pyridine is diluted in an organic solvent in a concentration of 1% to 10%, to maximally induce a Si—O—Si bond in the aerogel and thus make the network structure of the silica gel more stable. In this case, the organic solvent may be the aforementioned alcohol (a polar organic solvent), and particularly, may include ethanol.

In addition, the aging is to be carried out in an appropriate temperature range in order to enhance an optimal pore structure, and the aging of the present invention may be carried out by leaving at a temperature of 30° C. to 70° C. for 1 hour to 10 hours. If the aging temperature is lower than 30° C., the aging time may be excessively prolonged to lead to an increase in the entire process time, thereby reducing productivity. If the aging temperature is higher than 70° C., the temperature is over the boiling point of ethanol, and thus the loss of the solvent by evaporation may be increased, thereby increasing raw material costs.

In the surface-modifying of the gelated wet-gel blanket composite, a hydrophilic functional group is substituted with a hydrophobic functional group, and when the hydrophilic functional group present on the aerogel surface is substituted with the hydrophobic functional group, during the drying of the aerogel, the contraction of the pores by the surface tension of the solvent may be minimized due to the repulsive forces between the hydrophobic functional groups. The dried aerogel maintains a low thermal conductivity immediately after drying, but a hydroxy functional group present on the surface of the aerogel, for example, when the aerogel is silica aerogel, a hydrophilic silanol group (Si—OH) present on the silica surface absorbs water in air, thereby increasing a thermal conductivity gradually. Therefore, in order to maintain a low thermal conductivity, there is a need to modify the aerogel surface to hydrophobicity.

Thus, in an embodiment of the present invention, the surface-modifying may be performed by a surface-modifying agent including a polar solvent and an organosilane compound.

As the polar solvent, methanol, ethanol, isopropyl alcohol, or the like may be used, and as the organosilane compound, trimethylchlorosilane (TMCS), hexamethyldisilazane (HMDS), methyltrimethoxysilane, trimethylethoxysilane, ethyltriethoxysilane, phenyltriethoxysilane, or the like may be used, and particularly, the HMDS may be used.

During the surface-modifying, the aging solvent may be mixed at a volume ratio of 1 to 10 times the gel, and the organosilane compound may be mixed at a volume ratio of 0.1 to 10 times the gel. When the volume ratio of the organosilane compound is less than 0.1 times, the reaction time is excessively prolonged and the surface-modifying efficiency may be reduced. When the volume ratio of the organosilane compound is greater than 10 times, there is a problem of cost increase, and the unreacted surface-modifying agent may cause contraction during drying.

The aging and the surface-modifying may be performed in a separate reaction container after recovering the silica wet-gel blanket which is completely gelated, or may be performed inside the reaction container in which the gelation was performed, particularly, the aging and the surface-modifying may be performed in the above performed reaction container in terms of the efficiency of the process and the simplification of equipment. In addition, when the aging and the surface-modifying are performed in the reaction container in which the gelation was performed, the wet-gel blanket composite prepared in step 3) above can be rotated, and when the aging and the surface-modifying are performed while the wet-gel blanket composite is rotating, the aging solvent and the surface-modifying agent may be better penetrated, and after the aging solvent and the surface-modifying agent are penetrated, dispersion thereof may be performed better in the wet-gel blanket composite, and thus there is an advantage that aging efficiency and surface-modifying efficiency are significantly improved.

After performing the above surface-modifying, a hydrophobic wet-gel blanket composite may be obtained.

In addition, the method for producing an aerogel blanket of the present invention may further include 5) drying the wet-gel blanket. The wet-gel blanket composite may be dried to produce an aerogel blanket.

Meanwhile, the production method according to an embodiment of the present invention may further perform washing before the drying. The washing is for obtaining a highly pure hydrophobic aerogel blanket by removing impurities (sodium ions, unreactants, byproducts, etc.) generated during reaction and residual ammonia which can generate ammonium carbonate salts by reacting $CO_2$ during a supercritical drying, and may be performed with a dilution process or an exchange process using a nonpolar organic solvent.

In an embodiment of the present invention, the drying may be carried out by a process of removing the solvent while maintaining the pore structure of the aged gel as it is, and the drying may be carried out by a process of supercritical drying or atmospheric pressure drying.

The supercritical drying process may be carried out by using supercritical carbon dioxide. Carbon dioxide is in a gas state at room temperature and atmospheric pressure, but if the temperature and pressure are above a limit of certain temperature and high pressure, which is referred to as a supercritical point, the evaporation process does not occur, and thus the carbon dioxide becomes a critical state in which gas and liquid cannot be distinguished, and carbon dioxide in this critical state is referred to as supercritical carbon dioxide.

The supercritical carbon dioxide has properties in which a density of the molecule is similar to that of a liquid, but a low viscosity is similar to that of a gas, and has a fast diffusion speed and a high thermal conductivity, and thus drying efficiency may be high and a drying process time may be reduced.

Specifically, in the supercritical drying process, performed is a solvent substitution process in which the aged wet-gel blanket is added in a supercritical drying reactor, and then $CO_2$ in liquid form is filled therein and an alcohol solvent in the wet-gel is substituted with $CO_2$. Thereafter, the temperature is elevated to 40° C. to 70° C. at a constant heating rate, particularly, at a rate of 0.1° C./min to 1° C./min, and then a pressure equal to or higher than the pressure at which carbon dioxide becomes supercritical, particularly, a pressure of 100 bar to 150 bar is maintained, and carbon dioxide in supercritical state is maintained for a certain time, particularly, for 20 minutes to 1 hour. In general, carbon dioxide becomes supercritical at a temperature of 31° C. and a pressure of 73.8 bar. Carbon dioxide is maintained at a constant temperature and pressure, at which carbon dioxide becomes supercritical, for 2 hours to 12 hours, more particularly, for 2 hours to 6 hours, and then the pressure is gradually removed to complete the supercritical drying process, thereby producing an aerogel blanket.

In addition, the atmospheric pressure drying process may be performed according to a typical method such as hot air drying or IR drying under a temperature of 70° C. to 200° C. and atmospheric pressure (1±0.3 atm).

As a result of the drying process as described above, a blanket containing porous aerogel having nano-sized pores may be produced. In particular, the silica aerogel according to an embodiment of the present invention has high hydrophobicity as well as excellent physical properties, particularly, low tap density and high porosity, and the silica aerogel-containing blanket including the same has a low thermal conductivity and excellent mechanical flexibility.

In addition, before or after the drying process, a pressing process for adjusting the thickness and uniformizing the internal structure and surface shape of the blanket, a molding process for having an appropriate shape or morphology according to application of the blanket, or a lamination process for laminating a separate functional layer, and the like may be further performed.

Hereinafter, the process of recovering and reusing the non-impregnated catalyzed sol generated in steps 1) and 2) will be described in detail for each step.

Step A

In step A) above, after step 2) above of gelating, performed is a process of recovering a non-impregnated catalyzed sol, adding a solvent and diluting the non-impregnated catalyzed sol to stop gelating the recovered sol.

In step 1) above of impregnating the catalyzed sol into the blanket base, the catalyzed sol is added in an excessive amount so that the catalyzed sol may be fully impregnated into the blanket base, and thus non-impregnated sol, which is not impregnated into the blanket base and remained, is generated.

The non-impregnated sol, which is not impregnated into the blanket base and remained, has been catalyzed, and thus is gelated if there are no separate actions. Therefore, in the present invention, performed is a process in which the non-impregnated sol is recovered, and before the earlier recovered non-impregnated sol is gelated, the solvent is added to dilute the same, and thus the concentration of the precursor and the catalyst is lowered to a level that is difficult to perform the gelation, thereby stopping the gelation of the recovered sol.

In an embodiment of the present invention, the process of stopping the gelation of the recovered sol by adding the solvent to dilute may be achieved, specifically, by measuring the viscosity of the recovered sol and making the viscosity of the recovered sol lower than a certain level.

In step A) above, the addition of the solvent may be performed when the viscosity of the sol is 2 cp to 10 cp, particularly, 4 cp to 10 cp, and more particularly, 7 cp to 10 cp. When the viscosity of the recovered sol satisfies the above range, the recovered sol may be smoothly mixed with the added solvent to be appropriately diluted to a concentration in which the gelation is not progressed. Further, the network included in the recovered sol serves as a seed to help the gelation of a new catalyzed sol and the effect of reinforcing the structure and improving physical properties of the aerogel may be exhibited appropriately. In the case where the solvent is added when the viscosity of the recovered sol is greater than 10 cp, since the gelation of the recovered sol has been progressed at or above a certain level, the recovered sol may not be smoothly mixed with the added solvent and the gelated particles may form a precipitation. When the viscosity of the recovered sol is less than 2 cp, since it means that the gelation of the catalyzed sol in the blanket base has not been progressed, it may be difficult to expect the above effect that the network included in the recovered non-impregnated sol may exhibit to a newly prepared catalyzed sol.

The recovered sol may through the dilution of step A) above have a viscosity of 10 cp or less, particularly, 1 cp to 5 cp, and more particularly, 1 cp to 3 cp. In the case where the recovered sol has a viscosity at or above the lower limit of the above range in order to add the solvent, the recovered sol may be diluted to such a degree that when the recovered sol is reused in the preparing of the catalyzed sol in a subsequent stage, the network included in the recovered sol helps the gelation of a new catalyzed sol and the effect of reinforcing the structure and improving physical properties of the aerogel may be exhibited appropriately, and when the recovered sol through the dilution may have a viscosity within the upper limit of the above range, the gelation of the recovered sol may be stopped appropriately.

The solvent may be a solvent used in the preparation of the catalyzed sol in step 1) above, and particularly may be an organic solvent.

The organic solvent can be used without limitation as long as it has excellent compatibility with a sol precursor and water, and particularly, may be a polar organic solvent, and more particularly, an alcohol. The alcohol may be, particularly, monohydric alcohol such as methanol, ethanol, isopropanol and butanol; polyhydric alcohol such as glycerol, ethylene glycol, propylene glycol, diethylene glycol, dipropylene glycol, and sorbitol, and one of the above materials or a mixture of two or more thereof may be used. Among these, when the aerogel is prepared by using water and the non-impregnated sol which is subsequently recovered, when considering miscibility with aerogel which is prepared, monohydric alcohol having 1 to 6 carbon atoms such as methanol, ethanol, isopropanol, butanol, and the like may be used.

The recovering of the non-impregnated catalyzed sol may be performed when in step 1) above, the catalyzed sol and the blanket base are added to the reaction container, the catalyzed sol is impregnated into the blanket base, the blanket base is fully impregnated, and thus the liquid level in the reaction container does not change any more. Specifically, when the liquid level in the reaction container does not change after the impregnating, the non-impregnated catalyzed sol which remains in the reaction container may be recovered. A drain valve for recovering the non-impregnated catalyzed sol may be connected to the reaction container, and the non-impregnated catalyzed sol can be recovered by opening the drain valve.

The recovered non-impregnated catalyzed sol may be transferred to a separate container, and particularly, to a sol tank included in a separate aerogel blanket production device in which the recovered non-impregnated catalyzed sol is reused. Therefore, step A) above, that is, the process of recovering the non-impregnated catalyzed sol and adding a solvent to dilute may be performed in the sol tank of the separate aerogel blanket production device.

Step B

In step B) above, performed is a process of reusing the gelation-stopped recovered sol in preparing of the catalyzed sol.

The catalyzed sol may be prepared by mixing a sol and a base catalyst, and the components contained in the sol and the base catalyst are the same as described above in step 1) above.

The reuse may be performed by a method of adding, to the gelation-stopped recovered sol, a sol and a base catalyst which are used to prepare the catalyzed sol, or by a method of mixing a catalyzed sol separately prepared in the gelation-stopped recovered sol. Specifically, a method of adding a sol to the gelation-stopped recovered sol and then adding a base catalyst thereto may be sequentially performed. Thus, the concentration of the sol and the base catalyst contained in the gelation-stopped recovered sol may be adjusted to the concentration of the sol and the base catalyst contained in the catalyzed sol before carrying out the dilution of step A) above to have the same gelation time as the gelation time in step 2) above.

For example, the process of step A) above may be performed in a sol tank included in a separately additional aerogel blanket production device other than the aerogel blanket production device in which steps 1) and 2) above are performed, and the process of step A) may be performed by a method of adding a sol and a base catalyst used to prepare the catalyzed sol into a sol tank in which the gelation-stopped recovered sol is added, or by a method of adding a catalyzed sol which is separately prepared to a sol tank into which the gelation-stopped recovered sol is added. Specifically, a process, in which the sol is added to the sol tank into which the gelation-stopped recovered sol is added, and then the base catalyst is added, may be sequentially performed.

The sol tank is not particularly limited as long as it is a container which can hold the recovered sol and in which the process of producing the catalyzed sol can be performed.

The sol may include a sol precursor, water and an organic solvent, and may be prepared by mixing the same. The sol may be used in a form of a separately prepared sol, or may be used by a method in which a component for preparing the sol including a sol precursor, water, and an organic solvent is added to the gelation-stopped recovered sol. In this case, the sol precursor may be used in a form hydrolyzed by an acid catalyst, and the acid catalyst is the same as described above in step 1) above.

The catalyzed sol, which is prepared through step B) above, may contain 5 to 50 wt % of the gelation-stopped recovered sol, particularly 7 to 40 wt %, and more particularly, 10 to 35 wt %. The gelation-stopped recovered sol may include gelated particles that the gelation has been partially progressed to form, and the previously formed gelated particles are contained in the newly prepared catalyzed sol to serve as a seed to facilitate the gelation. Accordingly, when the gelation-stopped recovered sol is used in the preparation of the catalyzed sol, the gelation of the catalyzed sol can be easily performed, and the effect of reinforcing the structure and improving physical properties of the produced aerogel blanket may be achieved. When the content of the gelation-stopped recovered sol satisfies the above range, the effect of reinforcing the structure and improving the physical properties of the aerogel blanket can be exhibited more appropriately. When the content is too small, it is difficult to exhibit the effect of improving physical properties, and when the content is excessive, the gelation is not sufficiently delayed, and thus the gelation of the catalyzed sol to be prepared may proceed before the appropriate time point.

In addition, the method for producing an aerogel blanket according to an embodiment of the present invention may include producing of an aerogel blanket using the catalyzed sol prepared in step B) above.

The producing of an aerogel blanket using the catalyzed sol prepared in step B) above may be performed by steps 1) and 2) above and the same method as described above for subsequent additional processes. For example, in an embodiment of the present invention, the producing of an aerogel blanket using the catalyzed sol prepared in step B) above may include a roll-to-roll method in which the blanket base is disposed on a moving element, and the catalyzed sol prepared in step B) above is applied to the blanket base and gelated while continuously moving the moving element, or may include adding the blanket base and the catalyzed sol prepared in step B) above in a separate second reaction container to impregnate the catalyzed sol prepared in step B) into the blanket base and gelate the catalyzed sol. In an embodiment of the present invention, the gelating may include gelating the blanket base impregnated with the catalyzed sol while rotating the same.

In addition, in the producing of an aerogel blanket using the catalyzed sol prepared in step B) above, a process of recovering the non-impregnated catalyzed sol again and reusing the same to prepare a catalyzed sol may be performed, which may be repeated several times or more. That is, the process of recovering the non-impregnated catalyzed sol and reusing the same to prepare a catalyzed sol may be repeated at least one time, and the repeated times are not particularly limited, but for example, 1 to 20 times, and specifically 2 to 10 times.

The above-described method for producing an aerogel blanket of the present invention provides an aerogel blanket having a uniform thermal conductivity, and forming a uniform thermal conductivity in the blanket to significantly improve thermal insulation properties. In addition, according to the method for producing an aerogel blanket of the present invention, the catalyzed sol prepared by reusing the recovered non-impregnated sol may be easily gelated, and the effect of reinforcing the structure and improving physical properties of the produced aerogel blanket may be achieved. Therefore, the aerogel blanket produced through the process of recovering the non-impregnated catalyzed sol and reusing the same to prepare a catalyzed sol may exhibit further improved thermal conductivity characteristics.

In addition, according to an embodiment of the present invention, the aerogel blanket includes an aerogel and a blanket base, and specifically, the aerogel may be formed inside and on the surface of the blanket base, for example, a large amount of aerogel particles may be formed uniformly inside and on the surface of the blanket base, and the aerogel blanket may have an improved thermal conductivity of 10 mW/mK to 20 mW/mK.

The thermal conductivity is a value measured at room temperature (23±5° C.) according to a heat flow method by using HFM 436 Lambda equipment from NETZSCH.

Accordingly, the aerogel blanket of the present invention may be usefully used as a heat insulation material, a heat reserving material, or an incombustible material for a plant facility for thermal insulation such as industrial furnaces or pipes of various industrial equipment as well as for aircraft, ships, automobiles, and building structures.

Hereinafter, an aerogel blanket production device, in which the method for producing an aerogel blanket according to an embodiment of the present invention can be performed, will be described.

Figure 1:
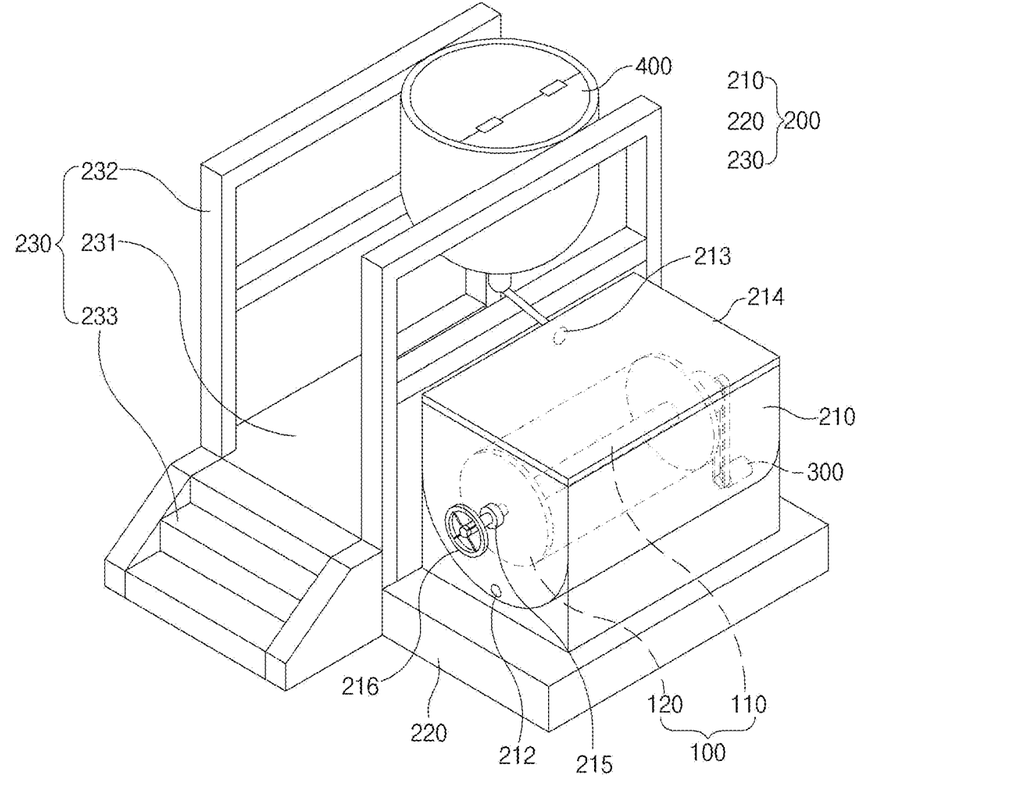
FIG. 1 is a perspective view of an aerogel blanket production device which may be used in the preparation of an aerogel blanket according to an embodiment of the present invention.

As shown in FIG. 1, the production device in which the method for producing an aerogel blanket according to an embodiment of the present invention can be performed includes a bobbin 100 around which a blanket is wound, and a main body 200 equipped with a gelling tank 210 accommodating the bobbin 100, a driving member 300 configured to rotate the bobbin 100 accommodated in the gelling tank 210, and a catalyzed sol supply member 400 configured to inject a catalyzed sol into the gelling tank 210, an aging member (not shown) configured to inject an aging solution into the gelling tank 210, a surface-modifying agent member (not shown) configured to inject a surface-modifying agent into the gelling tank 210, and a drying member (not shown) configured to increase the temperature of the gelling tank 210 to dry the blanket.

Here, the blanket may mean a blanket base before the catalyzed sol is added, a blanket base impregnated with the catalyzed sol, and/or a wet-gel blanket after the gelation, and may be properly interpreted according to the state of the blanket base for each step.

Bobbin

The bobbin is for winding the blanket in a roll shape, and includes a winding rod around which the blanket is wound in a roll shape and a support plate which is coupled to each end of the winding rod and supports a side portion of the blanket which is wound around the winding rod.

The winding rod has a cylindrical shape with a hollow that is penetrated in a longitudinal direction, and the blanket in a long sheet shape is wound around an outer surface of the winding rod in a roll shape.

Meanwhile, an outer portion of the blanket wound around the winding rod can be stably gelated because the catalyzed sol can be impregnated rapidly, but an inner portion of the blanket has a problem that it takes a long time to impregnate the catalyzed sol. To prevent this, an outer circumferential surface of the winding rod includes a plurality of connection holes which are connected to the hollow.

That is, the winding rod has a hollow therein so that the catalyzed sol injected into the gelling tank is allowed to flow into the hollow, and has a plurality of connection holes, through which the silica sol flowing into the hollow is discharged to the outside of the winding rod so as to be impregnated into the inner portion of the blanket wound around the winding rod. Thus, the inner portion and the outer portion of the blanket may be gelated at the same time by impregnating the silica sol. Therefore, a time taken to gelate the blanket may be significantly reduced to uniformly gelate the entire blanket.

Meanwhile, each of the plurality of connection holes has a diameter of 3 mm to 5 mm, and the plurality of connection holes are defined at regular intervals in the outer circumferential surface of the winding rod. Thus, the catalyzed sol may be uniformly supplied to the entire blanket wound around the outer circumferential surface of the winding rod to uniformly gelate the entire inner portion of the blanket.

The support plate is configured to support the blanket wound around the winding rod so that the blanket is not irregularly wound. The support plate has a disc shape and is coupled to each end of the winding rod to support the side portion of the blanket wound around the winding rod.

The support plate includes a coupling groove, to which the end of the winding rod is coupled, and a coupling hole defined in a bottom surface of the coupling groove. That is, the support plate may be coupled to the end of the winding rod through the coupling groove.

Meanwhile, a plurality of opening holes may be defined in the support plate. The catalyzed sol may flow into the side portion of the blanket wound around the winding rod through the plurality of opening holes, and thus, the side portion of the blanket may be stably gelated.

Therefore, the bobbin includes the winding rod and the support plate to thus wind the blanket in a roll shape.

Main Body

The main body is configured to install the gelling tank in which the bobbin is accommodated and includes the gelling tank and a first installation member 220 on which the gelling tank is installed.

The gelling tank is configured to gelate the blanket accommodated in the bobbin and includes a gelling chamber that is provided inside the gelling tank to accommodate the bobbin, a discharge part provided at an outer lower end of the gelling tank and connected to the gelling chamber, and an inflow part provided at an outer upper end of the gelling tank and connected to the gelling chamber.

Particularly, the gelling chamber of the gelling tank has a U-shaped cross-sectional shape of which an upper portion is opened by a cover, and a lower portion has a curvature corresponding to the blanket wound around the winding rod. Thus, when the silica sol flows into the gelling chamber, contact force between the silica sol and the blanket may increase to improve gelation of the blanket.

Meanwhile, the gelling tank includes a rotation member provided on both wall surfaces of the gelling chamber and coupled to both ends of the bobbin so that the bobbin is rotatably installed in the gelling chamber.

The rotation member is rotatably installed in a through-hole defined in each of both the wall surfaces of the gelling chamber so that the end of the bobbin accommodated in the gelling chamber is capable of transmitting power.

For example, a coupling protrusion having a straight-line shape is disposed on one surface of the rotation member, and a coupling groove having a straight-line shape and coupled to the coupling protrusion is defined in the end of the bobbin. That is, when the rotation member rotates, the bobbin may rotate in the same direction through the coupling of the coupling protrusion and the coupling groove. As a result, the bobbin may be rotatably installed inside the gelling tank.

Meanwhile, the main body further comprises a second installation member 230 on which the catalyzed sol supply member is installed. The second installation member includes a bottom piece 231, an installation frame 232 installed on an upper portion of the bottom piece 231 so that the catalyzed sol supply member is disposed higher than that gelling tank, and a stair 233 installed on an end of one side of the bottom piece.

The gelling tank may include a rotation handle coupled to the other rotation member provided in the gelling tank to allow the bobbin to rotate, and the rotation handle may manually rotate the bobbin at the outside.

Meanwhile, the aging member, a surface-modifying member, and the drying member are further installed on the installation frame of the second installation member.

Driving Member

The driving member is configured to rotate the bobbin accommodated in the gelling tank. The driving member is connected to the other rotation member provided in the gelling tank to transmit power. That is, when the rotation member rotates, the driving member may be interlocked with the rotation member to rotate the bobbin accommodated in the gelling tank.

Catalyzed Sol Supply Member

The catalyzed sol supply member is configured to gelate the blanket by injecting the silica sol into the gelling tank to impregnate the blanket wound around the bobbin, and is installed on the installation frame to supply the catalyzed sol into the gelling chamber through the inflow part of the gelling tank.

Aging Member

The aging member is configured to inject the aging solution to the gelling tank to age the blanket wound around the bobbin, and is installed on the installation frame to supply the aging solution into the gelling chamber through the inflow part of the gelling tank.

Surface-Modifying Member

The surface-modifying member is configured to inject the surface-modifying agent into the gelling tank so as to modify the surface of the blanket wound around the bobbin, and is installed on the installation frame to supply the surface-modifying agent into the gelling chamber through the inflow part of the gelling tank.

Drying Member

The drying member is configured to supply high-temperature hot air into the gelling tank so as to dry the blanket wound around the bobbin, and is installed on the installation frame and elevates a temperature of the gelling tank to dry the blanket accommodated in the gelling tank.

Thus, in the aerogel blanket production device according to an embodiment of the present invention, the time taken to produce the aerogel blanket may be significantly reduced, and the productivity of the aerogel blanket may be significantly improved to mass-produce the aerogel blanket.

Particularly, the aerogel blanket production device according to an embodiment of the present invention may induce the stable gelation regardless of a thickness and length of the blanket as the blanket rotates. Since the bobbin rotates, the entire blanket wound around the bobbin may be uniformly gelated. Also, since only the bobbin rotates without rotating the gelling tank, the gelling tank is not limited in shape. Also, since the gelling chamber of the gelling tank has the 'U'-shaped cross-sectional shape, the blanket wound around the bobbin may be more effectively gelated.

In addition, according to an embodiment of the present invention, the aerogel blanket production device includes the bobbin around which the blanket is wound, and the bobbin may include the winding rod and the support plate.

Here, the outer circumferential surface of the winding rod may include a fixing clip into which a winding start point of the blanket is fitted and fixed.

That is, the fixing clip has a pin shape having elastic restoring force and has one end fixed to the outer circumferential surface of the winding rod and the other end that is elastically supported on the outer circumferential surface of the winding rod. Therefore, when the start point of the blanket is inserted between the other end of the fixing clip and the winding rod, the blanket may be fixed to the start point of the winding rod by the elastic force of the fixing clip. As a result, the blanket may be easily wound around the outer circumferential surface of the winding rod.

MODE FOR CARRYING OUT THE INVENTION

Examples

Hereinafter, embodiments of the present invention will be described in detail so that a person with ordinary skill in the art can easily practice the present invention. The present invention may, however, be embodied in different forms and should not be construed as limited to the embodiments set forth herein.

Preparation Example 1: Preparation of Catalyzed Sol

Tetraethyl orthosilicate (TEOS) and water were mixed at a molar ratio of 1:4, ethanol having a weight ratio of 1:1 with TEOS was added thereto to prepare a silica sol precursor. Hydrochloric acid was added thereto so that the pH of a silica sol was 3 or less in order to promote hydrolysis, and the mixture was stirred for 2 hours or more to prepare a hydrated tetraethyl orthosilicate solution. Ethanol was added to the hydrated tetraethyl orthosilicate solution so as to be a weight ratio of 1:4 to prepare a silica sol. With respect to 100 parts by weight of the silica sol, 0.2 parts by weight of $TiO_2$, an opacifying agent, and 0.2 parts by weight of Ultracarb (LKAB Inc.), a fire retardant material, were mixed and stirred for 30 minutes to prepare the silica sol, and separately 1 vol % of an ammonia ethanol solution (base catalyst solution) was prepared. The silica sol and the base catalyst solution were mixed in a volume ratio of 9:1 to prepare a catalyzed sol.

Preparation Example 2: Preparation of Catalyzed Sol

After ethanol was added to the hydrated tetraethyl orthosilicate solution prepared in Preparation Example 1 above so as to be a weight ratio of 1:4, trimethylethoxysilane having the same moles as those of tetraethyl orthosilicate was added to prepare a silica sol. Thereafter, a catalyzed sol was prepared through the same process as in Preparation Example 1 above.

Example 1

(1) A bobbin around which 10 T (10 mm) glass fiber was wound was fixed in a reaction container of a first gelling device. The catalyzed sol (45 L, 150% of the glass fiber volume) prepared in Preparation Example 1 above was added to the reaction container and gelation was performed while rotating the bobbin around which the glass fiber was wound, and here, an addition rate of the catalyzed sol was adjusted to allow all the catalyzed sol to be added before completing the gelation. When the fiber was fully impregnated so that a liquid level in the reaction container does not change any more, the remaining non-impregnated sol (15 L) was recovered by opening a drain valve coupled to the reaction container.

(2) The recovered sol was transferred to a sol tank of a second gelling device. Before the viscosity of the recovered sol exceeded 10 cp, ethanol was added to dilute the recovered sol so that the gelation was stopped. A TEOS solution, ethanol, and additives were added to the diluted recovered sol, and a base catalyst solution was added thereto to prepare 45 L of a catalyzed sol. The TEOS solution, ethanol, additives, and the base catalyst solution were the same as those used in Preparation Example, and the ratio of the silica sol and the base catalyst solution, and the concentration of each component contained in the catalyzed sol were adjusted to be the same as in Preparation Example 1 above.

(3) A bobbin around which 10 T (10 mm) glass fiber was wound was fixed in a reaction container of a second gelling device. The catalyzed sol prepared in (2) above was added to the reaction container and gelation was performed while rotating the bobbin around which the glass fiber was wound, and here, an addition rate of the catalyzed sol was adjusted to allow all the catalyzed sol to be added before completing the gelation. When the fiber was fully impregnated so that a liquid level in the reaction container does not change any more, the remaining non-impregnated sol (15 L) was recovered by opening a drain valve coupled to the reaction container.

(4) The preparation process of the catalyzed sol of (2) above and the gelation process and the recovering process of (3) above were repeated, and when the preparation process of the catalyzed sol using the recovered non-impregnated sol and the gelation process using the catalyzed sol were performed a total of 10 times, the repetition was stopped.

A wet-gel blanket obtained from each gelation process was aged in 40 L of a basic aging solution, which is an ethanol diluted solution of 10 vol % of trimethylethoxysilane (TMES), at 65° C. for 20 hours, and then supercritical drying was performed to produce a silica aerogel blanket.

Example 2

A silica aerogel blanket was produced by performing the same process as in Example 1 above except that when the non-impregnated sol was recovered, only 7.5 L of the non-impregnated sol was recovered instead of 15 L thereof.

Example 3

A silica aerogel blanket was produced by performing the same process as in Example 1 above except that when the non-impregnated sol was recovered, only 5 L of the non-impregnated sol was recovered instead of 15 L thereof.

Example 4

The process of (1) to (4) above was repeated as in Example 1 except that the catalyzed sol prepared in Preparation Example 2 was used instead of the catalyzed sol prepared in Preparation Example 1 and trimethylethoxysilane having the same moles as those of tetraethyl orthosilicate was used when preparing the catalyzed sol by using the recovered non-impregnated sol.

A wet-gel blanket obtained from each gelation process was aged at 65° C. for 20 hours without a separate aging solution, and then supercritical drying was performed to produce a silica aerogel blanket.

Example 5

A silica aerogel blanket was produced by performing the same process as in Example 1 above except that when the non-impregnated sol was recovered, only 2.5 L of the non-impregnated sol was recovered instead of 15 L thereof.

Example 6

A silica aerogel blanket was produced by performing the same process as in Example 1 above except that 51 L (170% of the glass fiber volume) of the catalyzed sol was prepared and used instead of 45 L (150% of the glass fiber volume) and 21 L of the non-impregnated sol was recovered instead of 15 L.

Example 7

(1) While 45 L of the catalyzed sol prepared in Preparation Example 1 above was introduced at a constant flow rate of 1.32 L/min in an impregnating bath installed on the front end of a conveyor belt, 10 T (10 mm) glass fiber was impregnated in the impregnating bath for 2 minutes while being carried on the conveyor belt at a constant rate of 0.15 m/min. The fiber taken out of the impregnating bath was gelated while being carried on the belt, and at the rear end of the belt, the fiber, in which the gelation was completed, was wound around the bobbin in a roll shape. After 45 L of sol was all added, 5 L of non-impregnated sol which remains in the impregnating bath was recovered.

(2) The recovered sol was added to a separate sol tank, and before the viscosity of the recovered sol exceeded 10 cp, ethanol was added to dilute the recovered sol so that the gelation was stopped. A TEOS solution, ethanol, and additives were added to the diluted recovered sol, and a base catalyst solution was added thereto to prepare 45 L of a catalyzed sol. The TEOS solution, ethanol, additives, and the base catalyst solution were the same as those used in Preparation Example, and the ratio of the silica sol and the base catalyst solution, and the concentration of each component contained in the catalyzed sol were adjusted to be the same as in Preparation Example 1 above.

(3) While 45 L of the catalyzed sol prepared in (2) above was introduced at a constant flow rate of 1.32 L/min in an impregnating bath installed on the front end of a separate conveyor belt from (1) above, 10 T (10 mm) glass fiber was impregnated in the impregnating bath for 2 minutes while being carried on the conveyor belt at a constant rate of 0.15 m/min. The fiber taken out of the impregnating bath was gelated while being carried on the belt, and at the rear end of the belt, the fiber, in which the gelation was completed, was wound around the bobbin in a roll shape. After 45 L of sol was all added, 5 L of non-impregnated sol which remains in the impregnating bath was recovered.

(4) The preparation process of the catalyzed sol of (2) above and the gelation process and the recovering process of (3) above were repeated, and when the preparation process of the catalyzed sol using the recovered non-impregnated sol and the gelation process using the catalyzed sol were performed a total of 10 times, the repetition was stopped.

A wet-gel blanket obtained from each gelation process was aged in 40 L of a basic aging solution, which is an ethanol diluted solution of 10 vol % of trimethylethoxysilane (TMES), at 65° C. for 20 hours, and then supercritical drying was performed to produce a silica aerogel blanket.

Comparative Example 1

A silica aerogel blanket was produced by performing the same process as in Example 1 above except that when the non-impregnated sol was recovered, only 1.5 L of the non-impregnated sol was recovered instead of 15 L thereof.

Comparative Example 2

A silica aerogel blanket was produced by performing the same process as in Example 1 above except that 66 L (220% of the glass fiber volume) of the catalyzed sol was prepared and used instead of 45 L (150% of the glass fiber volume) and 36 L of the non-impregnated sol was recovered instead of 15 L.

Experimental Example

1) Measurement of Thermal Conductivity at Room Temperature (mW/mK)

From the aerogel blanket produced in each of Examples and Comparative Examples, five samples, each of which has a size of 30 cm×30 cm, per each blanket were prepared, and the thermal conductivity at room temperature (23±5° C.) of each sample was measured by using HFM 436 Lambda equipment from NETZSCH. In this case, the five samples were obtained by cutting the aerogel blanket roll, which was prepared in each of Examples and Comparative Examples, from the innermost side to the outermost side at a constant interval of 50 cm. After the thermal conductivity of each of the five samples was measured, the highest value and the lowest value of the thermal conductivity are shown in comparison.

2) Measurement of Gelation Time

The time taken to gelate in each of Examples and Comparative Examples was measured, and the gelation time depending on the number of times of reusing the sol of each of Example 1 and Comparative Example 1 is shown in Table 2.

TABLE 1

| Number of times of reusing sol | Using amount of non-impregnated sol (wt %) | Thermal conductivity at room temperature (mW/mK) | | | | | | | | | | |
|---|---|---|---|---|---|---|---|---|---|---|---|---|
| | | 0 times | 1 time | 2 times | 3 times | 4 times | 5 times | 6 times | 7 times | 8 times | 9 times | 10 times |
| Example 1 | 33 | 18.5 | 17.4 | 17.3 | 17.2 | 17.0 | 16.4 | 16.2 | 16.6 | 16.6 | 16.5 | 16.1 |
| Example 2 | 16.7 | 19.0 | 17.9 | 17.6 | 17.8 | 17.8 | 17.5 | 17.3 | 17.6 | 17.1 | 17.6 | 17.0 |
| Example 3 | 11.1 | 18.6 | 17.8 | 17.7 | 17.5 | 17.3 | 17.4 | 17.6 | 16.9 | 16.9 | 17.2 | 17.1 |
| Example 4 | 33 | 19.1 | 17.5 | 17.3 | 17.1 | 17.3 | 17.2 | 16.8 | 16.9 | 16.6 | 16.8 | 16.7 |
| Example 5 | 5.6 | 18.2 | 17.8 | 17.7 | 17.5 | 17.6 | 17.3 | 17.4 | 17.4 | 17.5 | 17.2 | 17.4 |
| Example 6 | 41.2 | 18.5 | 17.6 | 17.2 | 17.4 | 17.3 | 17.4 | 17.5 | 17.6 | 17.5 | 17.4 | 17.6 |
| Example 7 | 11.1 | 18.8 | 18.1 | 17.9 | 17.6 | 17.5 | 17.3 | 17.2 | 17.4 | 17.3 | 17.3 | 17.2 |
| Comparative Example 1 | 3.3 | 18.5 | 18.6 | 18.4 | 18.8 | 19.1 | 18.6 | 18.7 | 18.5 | 18.9 | 18.6 | 18.8 |
| Comparative Example 2 | 54.5 | 18.3 | 18.5 | 18.6 | Incapable of producing aerogel blanket | | | | | | | |

TABLE 2

| Number of times of reusing sol | Gelation time (min) | | | | | | | | | | |
|---|---|---|---|---|---|---|---|---|---|---|---|
| | 0 times | 1 time | 2 times | 3 times | 4 times | 5 times | 6 times | 7 times | 8 times | 9 times | 10 times |
| Example 1 | 11.5 | 10.5 | 10 | 10 | 9 | 9.5 | 9 | 9 | 9 | 9.5 | 9 |
| Comparative Example 1 | 11.5 | 11.5 | 11 | 11.5 | 11 | 11 | 11.5 | 11 | 11 | 11 | 11.5 |

As can be seen in Table 1 above, in the case of Examples 1 to 7, it can be confirmed that as the number of times to recover and use the non-impregnated sol in the preparation of the catalyzed sol increases, the thermal conductivity at room temperature of the silica aerogel blanket produced by using the same shows a decreasing trend. This is because the silica particles, which have been previously formed in the non-impregnated sol, serve as a seed so that gelation is facilitated and physical properties are improved. It can be confirmed through the time taken to gelate that the gelation is facilitated, and before using the non-impregnated sol, it took 11 to 12 minutes to gelate, but when using the non-impregnated sol, the gelation time was reduced from 9 to 10 minutes. Specifically, as can be seen from Table 2 above, in the case of Example 1, as the number of times to reuse the sol increases, the gelation time is reduced and it took 9 minutes or 9.5 minutes to gelate after reusing the sol four times so that it can be confirmed that the gelation is facilitated as the non-impregnated sol is reused.

On the other hand, referring to Comparative Example 1, when the non-impregnated sol was used in an amount of only 1.5 L (3.3%) of 45 L of the total catalyzed sol, it can be confirmed that the effect of reducing the thermal conductivity at room temperature was not exhibited and the effect of reducing the gelation time was not obtained either.

Meanwhile, in the case of Comparative Example 2, as the recovered non-impregnated sol was excessively used, the viscosity of the sol was increased according to the number of times to reuse since the gelation was not completely stopped even when the recovered non-impregnated sol was diluted with ethanol, so that the viscosity of the sol was excessively increased from reusing three times to the extent that the impregnation of the fiber was difficult, and thus it was impossible to produce the aerogel blanket.

An additional experiment was performed to confirm the effect depending on the viscosity when recovering the non-impregnated sol as follows.

Reference Example 1

A silica aerogel blanket was produced by performing the same process as in Example 1 except that when the viscosity of the recovered sol was 15 cp, ethanol was added to dilute the recovered sol so that the gelation was stopped.

TABLE 3

| Number of times of reusing sol | Thermal conductivity at room temperature (mW/mK) | | | | | | | | | | |
|---|---|---|---|---|---|---|---|---|---|---|---|
| | 0 time | 1 times | 2 times | 3 times | 4 times | 5 times | 6 times | 7 times | 8 times | 9 times | 10 times |
| Example 1 | 18.5 | 17.4 | 17.3 | 17.2 | 17.0 | 16.4 | 16.2 | 16.6 | 16.6 | 16.5 | 16.1 |
| Example 2 | 19.0 | 17.9 | 17.6 | 17.8 | 17.8 | 17.5 | 17.3 | 17.6 | 17.1 | 17.6 | 17.0 |
| Example 3 | 18.6 | 17.8 | 17.7 | 17.5 | 17.3 | 17.4 | 17.6 | 16.9 | 16.9 | 17.2 | 17.1 |
| Example 4 | 19.1 | 17.5 | 17.3 | 17.1 | 17.3 | 17.2 | 16.8 | 16.9 | 16.6 | 16.8 | 16.7 |
| Example 5 | 18.2 | 17.8 | 17.7 | 17.5 | 17.6 | 17.3 | 17.4 | 17.4 | 17.5 | 17.2 | 17.4 |
| Example 6 | 18.5 | 17.6 | 17.2 | 17.4 | 17.3 | 17.4 | 17.5 | 17.6 | 17.5 | 17.4 | 17.6 |
| Example 7 | 18.8 | 18.1 | 17.9 | 17.6 | 17.5 | 17.3 | 17.2 | 17.4 | 17.3 | 17.3 | 17.2 |
| Reference Example 1 | 18.5 | 18.6 | 18.4 | 18.8 | 19.1 | 18.6 | 18.7 | 18.5 | 18.9 | 18.6 | 18.8 |

Referring to Reference Example 1 in Table 3 above, in the case of diluting the non-impregnated catalyzed sol by adding a solvent when the viscosity of the non-impregnated sol is too high, it can be confirmed that as the number of times, in which the non-impregnated sol is recovered and used to prepare the catalyzed sol, increases, the thermal conductivity at room temperature of the silica aerogel blanket produced by using the same rather increases. This is because when the gelation of the non-impregnated sol proceeds above a certain level and exceeds the limit, the solvent added for dilution and the non-impregnated sol are not smoothly mixed, and the silica particles are precipitated, and as the number of reusing increases, the amount of precipitation increases, thereby adversely affecting the physical properties of the produced silica aerogel blanket.

DESCRIPTION OF THE SYMBOLS

100: Bobbin
120: Support plate
210: Gelling tank
213: Inflow part
110: Winding rod
200: Main body
212: Discharge part
214: Cover
215: Rotation member
220: First installation member
231: Bottom piece
233: Stair
400: Catalyzed sol supply member
216: Rotation handle
230: Second installation member
232: Installation frame
300: Driving member

The invention claimed is:

1. A method for producing an aerogel blanket, the method comprising:
   1) impregnating a catalyzed sol into a blanket base; and
   2) gelating the catalyzed sol to prepare a wet-gel blanket composite, wherein the method comprises:
   A) after the impregnating, recovering a non-impregnated catalyzed sol, and then stopping gelation of the recovered sol by adding a solvent to dilute the non-impregnated catalyzed sol; and
   B) reusing the gelation-stopped recovered sol in preparing of a catalyzed sol,
   wherein the catalyzed sol prepared through step B) above contains 5 to 50 wt % of the gelation-stopped recovered sol.

2. The method of claim 1, wherein in step A) above, the adding of the solvent is carried out when the viscosity of the recovered sol is 2 cp to 10 cp.

3. The method of claim 1, wherein the recovered sol through the dilution in step A) above has a viscosity of 1 cp to 5 cp.

4. The method of claim 1, wherein the catalyzed sol prepared through step B) above comprises the gelation-stopped recovered sol in an amount of 7 to 40 wt %.

5. The method of claim 1, wherein the catalyzed sol is added so as to be a volume of 100 to 170% with respect to the volume of the blanket base.

6. The method of claim 1, wherein performing step 2) above begins before completing step 1) above.

7. The method of claim 1, further comprising:
   3) Aging the gelated wet-gel blanket composite; and
   4) surface-modifying the gelated wet-gel blanket composite.

8. The method of claim 1, further comprising 5) drying the wet-gel blanket composite,
   wherein the drying is performed by a process of supercritical drying or atmospheric pressure drying at a pressure of 1±0.3 atm and a temperature of 70° C. to 200° C.

9. The method of claim 1, wherein the impregnation in step 1) above is performed while the blanket base rotates.

10. The method of claim 9, wherein the rotation of the blanket base has a rotation speed of 1 rpm to 300 rpm.

11. The method of claim 1, wherein step 1) above is carried out by a process of adding the blanket base, which is wound around a bobbin, to a reaction container, then rotating the bobbin to allow the blanket base to rotate, and impregnating the catalyzed sol to the blanket base.

12. The method of claim 11, wherein step 1) above is carried out by any one method from among a method of adding the catalyzed sol to the reaction container after adding the blanket base thereto, a method of adding the blanket base to the reaction container after adding the catalyzed sol thereto, and a method of adding the blanket base to the reaction container while adding the catalyzed sol thereto.

13. The method of claim 1, wherein in step 2) above, the gelation is performed while rotating the blanket base impregnated with the catalyzed sol.

14. The method of claim 1, further comprising impregnating the catalyzed sol prepared in step B) above into a separate blanket base and gelating the blanket base impregnated with the catalyzed sol while rotating the same.

15. The method of claim 7, wherein the aging and the surface-modifying are carried out while rotating the wet-gel blanket composite prepared in step 2) above.

\* \* \* \* \*